United States Patent [19]

Daimon et al.

[11] Patent Number: 5,480,694

[45] Date of Patent: Jan. 2, 1996

[54] MAGNETIC RECORDING MEDIUM

[75] Inventors: Hideo Daimon, Toride; Osamu Kitakami; Hideo Fujiwara, both of Ibaraki, all of Japan

[73] Assignee: Hitachi Maxell, Ltd., Osaka, Japan

[21] Appl. No.: 532,756

[22] Filed: Jun. 4, 1990

[30] Foreign Application Priority Data

Jun. 5, 1989 [JP] Japan ..................... 1-142599
Nov. 29, 1989 [JP] Japan ..................... 1-310070

[51] Int. Cl.$^6$ .................... B32B 3/02; G11B 5/66
[52] U.S. Cl. ............... 428/64.1; 428/65.3; 428/65.6; 428/336; 428/650; 428/652; 428/678; 428/694 T; 428/694 TR; 428/694 ST; 428/694 SG; 428/702; 428/704; 428/800; 427/128; 427/129
[58] Field of Search ...................... 428/678, 694, 428/900, 694 T, 694 TR, 694 ST, 694 SG, 336, 650, 652, 65.3, 65.6, 64.1, 702, 704; 427/128, 129

[56] References Cited

U.S. PATENT DOCUMENTS 4,738,885 4/1988 Matsumoto ..................... 428/694
4,774,130 9/1988 Endo et al. ..................... 428/694

FOREIGN PATENT DOCUMENTS 2142043 1/1985 United Kingdom .

OTHER PUBLICATIONS

Journal of the Electrochemical Society: Electrochem. Sc. and Techn., vol. 122, No. 1, Jan. 1975, USA, pp. 32–36; S. Kawai et al.
IEEE Transactions on Magnetics, vol. 23, No. 5, Sep. 1987, NY, USA, pp. 2245–2247, K. I. Arai, et al.
JP-A-62 125526, Jun. 6, 1987, Nippon Gokki Seizo K.K.-Abstract.
Patent Abstracts of Japan, vol. 11, No. 173 (P-582) 4 Jun. 1987, and JP-A-62 003423 (Pilot Precision Co Ltd) 9 Mar. 1987.
Patent Abstracts of Japan, vol. 11, No. 256 (P-607) 20 Aug. 1987, and JP-A-62 062419 (Pilot Precision Co Ltd) 19 Mar. 1987.
Patent Abstracts of Japan, vol. 9, No. 97 (P-352) 26 Paril. 1985, and JP-A-59 221826 (Toshirou Takahashi) 13 Dec. 1984.

Primary Examiner—L. Kiliman
Attorney, Agent, or Firm—Birch, Stewart, Kolasch & Birch

[57] ABSTRACT

A magnetic recording medium comprising alumite made by anodic oxidation of aluminum or an aluminum alloy and comprising fine pores in which a ferromagnetic material is filled, wherein an in-plane remanence is at least 2.5 times greater than a perpendicular remanence and a magnetic recording medium of the above alumite, wherein the magnetic material is at least one material selected from the group consisting of Fe or Co, alloy mainly composed of Fe or Co, an Co or Fe containing a P element, and an alloy mainly composed of Co or Fe and containing the P element.

8 Claims, 3 Drawing Sheets

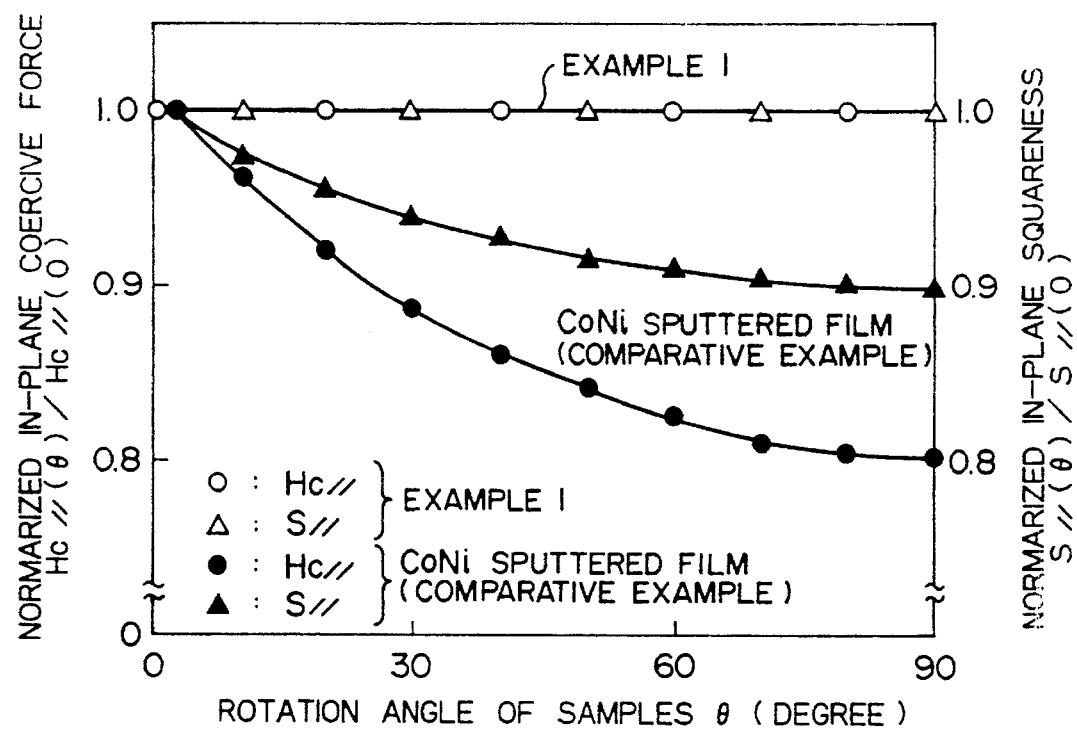
F I G. 1

MAGNETIC RECORDING MEDIUM

BACKGROUND OF THE INVENTION

Field of the Invention

The present invention relates to a magnetic recording medium, and more specifically, to a magnetic recording medium including a magnetic alumite in-plane anisotropy film.

Statement of Related Art

It is known that a magnetic alumite film in which fine pores in the alumite are filled with a magnetic metal such as Fe, Co, Ni and the like by plating, exhibits perpendicular magnetic anisotropy because of its shape anisotropy.

Recently, it has become possible to control the coercive force of an alumite perpendicular magnetization film to 1000 Oe or less by a fine pore enlarging treatment and thus the possibility of applying the magnetic alumite film to a perpendicular magnetic recording medium is increased.

Nevertheless, since the read and write characteristics of a perpendicular magnetic recording medium (hereinafter, referred to as R/W characteristics) are greatly deteriorated as the distance (spacing) between a head and a medium increases in perpendicular magnetic recording, a stable spacing of 0.05 micrometer or less is necessary to make the best use of the intrinsic characteristics of the perpendicular magnetic recording.

In a hard disk having a magnetic alumite film, a magnetic head is floated about 0.3 micrometer above a medium while recording and reproduction are executed and this floating amount does not permit recording to be sufficiently performed to the lowermost layer of the medium in a perpendicular magnetic recording. As a result, sufficient output cannot be obtained in reproduction and further sufficient overwrite characteristics cannot be obtained.

Therefore, as a principle, perpendicular magnetic recording making use of a magnetic alumite film, as well as a perpendicularly magnetized film, is executed using a head/medium contact type.

A CoCr or Co-CoO type perpendicular anisotropy film can provide a flexible medium such as a tape or floppy to realize the head/medium contact type. However, cracks easily develop in the magnetic alumite film when it is bent because amorphous $Al_2O_3$ constituting alumite is hard and brittle, and thus it is very difficult to make a flexible medium using magnetic alumite film.

Because of the reason mentioned above, alumite perpendicular anisotropy films have a fatal drawback in that they cannot be practically used as a magnetic recording medium, although exhibiting excellent perpendicular magnetic anisotropy.

SUMMARY OF THE INVENTION

The first object of the present invention is to provide an alumite type magnetic recording medium exhibiting excellent R/W characteristics, even if a magnetic head is floated about 0.15 to 0.35 micrometer above the surface of a magnetic alumite film.

A second object of the present invention is to provide a magnetic recording medium having an in-plane anisotropy film exhibiting stable R/W characteristics.

To achieve the first object of the present invention, as shown in FIG. 3, a magnetic recording medium is provided comprising an alumite layer 3 made by anodic oxidation of aluminum or an aluminum alloy having fine pores in which a ferromagnetic material 1 is filled, characterized in that in-plane remanence is 2.5 times or more greater than a perpendicular remanence.

Hereinafter, "a body of magnetic material existing in each pore" is referred to as "a magnetic particle".

To achieve the second object, the second aspect of the present invention is to provide a magnetic recording medium comprising an in-plane magnetic anisotropy film composed of porous alumite formed on a substrate, characterized in that anisotropy field Hk in the film plane is 100 Oe or less.

The magnetic recording medium of the present invention is preferable for a rigid disk.

A third aspect of the present invention is to use Co or Co-Ni alloy containing Fe as a magnetic material to be filled in alumite fine pores by plating.

The magnetic recording medium having the alumite fine pores in which the magnetic material is filled by plating can be made into a longitudinal magnetic recording medium.

BRIEF DESCRIPTION OF THE DRAWINGS

FIG. 1 is a characteristic diagram showing the direction dependence of in-plane magnetic characteristics of a Co-P plated alumite film of Example 1 and a CoNi sputtered film of Comparative Example 1;

DETAILED DESCRIPTION OF THE INVENTION

Figure 2A:
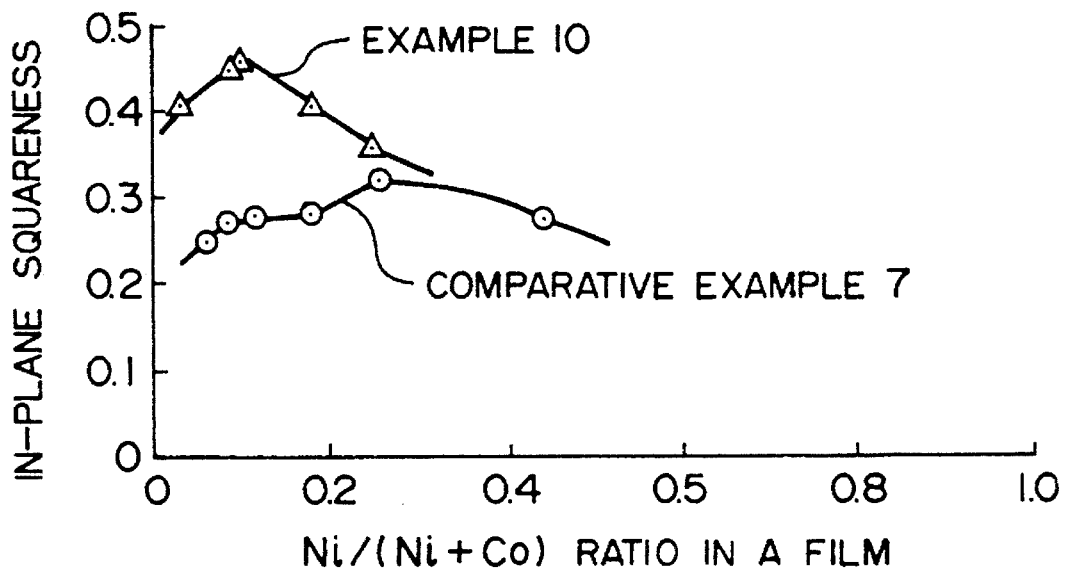
FIG. 2A is a characteristic diagram showing the relationship between the content of Ni/(Ni+Co) in the films and the in-plane squareness of the plated films obtained from Example 10 and Comparative Example 7.

According to the first aspect of the present invention, the above problems can be solved by providing a magnetic alumite film with an in-plane magnetic anisotropy.

An in-plane magnetic anisotropy film has an output spacing loss of −49.5 dB when a recording wavelength is 0.5 micrometer and a spacing is 0.25 micrometer, whereas a perpendicular magnetic anisotropy film has that of −60 to −90 dB. Under this condition, the in-plane magnetic anisotropy film has a reproducing output which is 3.3 to 106 times higher than that of the perpendicular magnetic anisotropy film, and when a recording wavelength is set to a given value of 0.5 micrometer and a spacing is made greater than 0.25 micrometer, a difference between the reproducing outputs thereof is more increased. From the above-mentioned, it is possible that an ultra-high density recording greater than 500 kbpi can be effected by perpendicular magnetic recording in principle in the case of head/medium contact type recording, but the in-plane magnetic anisotropy film is advantageously used as a medium in a medium/head noncontact type magnetic recording system which is usually used at a linear recording density of 50 kbpi or less.

It has been reported that in-plane magnetic anisotropy was induced by filling the fine pores of alumite anodized in a sulfuric acid bath with CoNi alloy (J. Electrochem. Soc., Vol. 122, No. 1, pp 32 (1975) Kawai et al). In the case of this medium, however, a ratio of an in-plane remanence to a perpendicular remanence (Mr∥/Mr⊥) was small in an amount of 2.5 and thus a substantial amount of a perpendicular magnetization component remains. When the Mr∥/Mr⊥ is less than 2.5, the reproducing output is greatly lowered because of the large spacing loss.

Further, in the case of the above publication, since a magnetic layer has a large thickness of 1 micrometer, a magnetic head cannot effect a saturation recording, and further since a porosity of alumite is less than 0.1 and thus the saturation magnetization as a magnetic alumite film has a small value of about 60 emu/cc, sufficient reproducing output cannot be provided.

To solve these problems, an alumite magnetic layer is made to a thickness of 500 to 5000 angstroms and further a porosity is made to 0.1 to 0.75 to decrease the perpendicular shape anisotropy, with a result that excellent in-plane magnetic characteristics having a Mr∥/Mr⊥ of 2.5 or more are provided and a saturation magnetization can be increased to 3.5 times that of the prior art. The upper limit value of the Mr∥/Mr⊥ is not particularly specified, but it is generally about 20.

When the magnetic layer has a thickness exceeding 5000 angstroms, a magnetic head cannot effect a sufficient recording, whereas when it is 500 angstroms or less, an absolute value of magnetization amount as a magnetic alumite film is made too small and thus a sufficient reproducing output cannot be provided. Porosity, when used herein, means a ratio of pore area to cell area. A porosity greater than the conventional 0.06 can increase an amount of saturation magnetization of a conventional magnetic alumite film. The upper limit of the porosity is considered to be about 0.75 (pore diameter=0.9×cell diameter), i.e., when the pore diameter is 90% of the cell diameter, porosity will be 0.75 when it exceeds this value, fine pores are partially connected to each other, and thus the characteristic of the magnetic alumite film in which magnetic particles are separated by a nonmagnetic region (amorphous $Al_2O_3$) is lost.

For example, a magnetic material mainly comprising Co or Fe is used as a ferromagnetic material to be filled into alumite fine pores (e.g., alumite anodized in sulfuric acid, oxalic acid, or phosphoric acid) and thus the large crystalline magnetic anisotropy of Co (Co single crystal: $4.36 \times 10^6$ erg/cc) is used together with the above decrease in perpendicular shape anisotropy.

For example, an addition of another element to Co or Fe can improve the in-plane magnetic characteristics. Elements to be added to Co or Fe may be a magnetic member or a nonmagnetic member, that is, it may be any element as long as it induces in-plane magnetic anisotropy, and includes at least one element of, for example, P, S, B, Ni, Zn, Mn, Ag, Pb, Sn, W, Cu, Rh, Re, Pt, Pd, Au and the like and the hydroxides, oxides, phosphides, sulfides, and borides thereof.

These nonmagnetic additives must be soluble in a plating bath to be used and be capable of being plated together with Co or Fe. The nonmagnetic additives can be independently used or two or more thereof can be used in combination. In short, components necessary to provide desired in-plane magnetic characteristics can be suitably selected and used.

According to the present invention, it was discovered by the inventors that a magnetic alumite film having in-plane magnetic anisotropy (magnetic film having an in-plane remanence greater than a perpendicular remanence) could be provided by the inclusion of the P element (phosphorus) in a magnetic material composed of a Co simple substance or alloy mainly composed of Co in alumite fine pores.

The alloy mainly composed of Co is an alloy including Co exceeding 50%, such as Co-Ni, Co-Fe, Co-Ni-Fe and the like.

In general, a content of P (phosphorus element) in the magnetic material is preferably within a range from 0.05 to 33 at % and more preferably within a range from 2 to 10 at %. When a Co magnetic member filled in pores in alumite contains P within a range from 2 to 10 at %, a Co plated alumite film can be provided with strong in-plane magnetic anisotropy.

Further, when a porosity of alumite (a ratio of the area of pores occupied in a cell) is increased to 0.3 to 0.7 and an axial ratio of Co-P particles is made to 0.5 to 10, the shape anisotropy of the Co-P particles can be reduced and the in-plane magnetic characteristics can be more imporved.

A content of P in a Co or a Co magnetic alloy material is 33 at % or less, and a content thereof exceeding 33 at % is not preferable because it greatly reduces saturation magnetization and lowers a reproducing output. The lower limit of the content of P in the Co or Co magnetic alloy member is not particularly specified, because even a slight amount of P added to Co has an effect to form an in-plane anisotropy film, but it is generally 0.05 at % or more.

In general, a content of P is preferably 2 to 10 at %, and an amount less than 2 at % is insufficient to further improve the in-plane magnetic characteristics and an amount exceeding 10 at % makes an in-plane coercive force greater than 1500 Oe and thus there is a possibility that a saturation recording cannot be effected.

On the other hand, a porosity of alumite is preferably 0.1 to 0.75 and an axial ratio of Co-P particles subsequently formed by filling of Co-P ferromagnetic material into alumite fine pores is preferably 0.5 to 10 to lower shape anisotropy and further improve the in-plane magnetic characteristics. An increase in the porosity also provides an effect for increasing the saturation magnetization of the magnetic alumite film and is also advantageous to improve a reproducing output.

A content of Cu is preferably within a range from 0.05 to 50 at % and more preferably within a range from 0.1 to 30 at %.

A content of other nonmagnetic members necessary to provide desired in-plane magnetic characteristics can be suitably determined by a person skilled in the art experimentally.

An in-plane coercive force of the in-plane magnetization film is preferably 500 to 1500 Oe. An in-plane coercive force less than 500 Oe is not enough for magnetic recording mediums, because demagnetization effects become large. Whereas, when an in-plane coercive force exceeds 1500 Oe, sufficient recording cannot be effected by a magnetic head. As described above, in the magnetic alumite film according to the present invention, a longitudinal magnetic recording is made possible, reduction in the reproducing output is restricted with respect to a floating amount of a magnetic head, and sufficient overwrite characteristics can be expected.

Further, since respective magnetic particles subsequently formed by filling the magnetic material into alumite fine pores are surrounded by aluminum oxide and perfectly separated, they are excellent in corrosion resistance and durability and further zigzag domains are difficult to be generated in a magnetizing transition region. As a result, less noise is produced in reproduction to permit a high reproducing output and a noise reduction is expected. In addition, since in-plane anisotropy directed to a particular direction is not produced (in-plane anisotropy magnetic field ~50 Oe), no modulation arises in reproduction.

A phosphorus compound soluble in a Co plating bath is used as a source for supplying the P element to be added to Co or Co alloy. Phosphite and hypophosphite in which a valence number of P is $\neq$ or less such as, for example, sodium phosphite ($Na_2HPO_3$), sodium hypophosphite ($NaPH_2O_2$) and the like are preferably used as the phosphorus compound. Phosphite and hypophosphite can be used independently or in combination with two or more types thereof. P having a valence number exceeding $\neq$ is not mixed in Co. Therefore, phosphoric acid ($H_3PO_4$) is not taken into Co in alumite fine pores, even if it is added to the Co plating bath. In this case, P has a valence number of +5 and the electron configuration of P is the same that of Ne. Therefore, it is considered to be related to the above phenomenon that P having a valence number of +5 is made stable and thus no electron is delivered in plating.

A content of the P element in the Co or Co magnetic alloy material can be controlled by changing plating conditions such as a plating time, applied voltage, a pH, a bath temperature and the like in addition to a concentration of a phosphorus compound to be added to a plating bath.

The above description with respect to the above P is also applicable substantially to Cu and other nonmagnetic members and low saturation magnetization magnetic members, and they are supplied into a ferromagnetic member by a compound soluble to a plating bath and a content thereof is controlled by the same method as the case of the P.

Since sulfuric acid has a large dissociation constant and lowers an electrical resistance of a bath, a voltage applied thereto is about ~20 V, when an anodic oxidation is effected, and a diameter of fine pores is ~200 angstroms. In contrast, sulfuric acid, oxalic acid and phosphoric acid have a small dissociation constant and thus a large voltage is applied when an anodic oxidation is effected. Therefore, alumite having a fine pore diameter of ~500 angstroms can be obtained, and thus when a magnetic layer has the same thickness, alumite having an axial ratio half of that provided in the sulfuric acid bath can be obtained. When the fine pores are enlarged in a bath of phosphoric acid, sulfamic acid or the like after the anodic oxidation has been effected, the axial ratio can be further reduced.

Although the in-plane anisotropy film can be formed by the addition of P and the control of the axial ratio as described above, other methods can be also used.

For example, when Cr underlayers are filled in alumite fine pores and the magnetic member according to the present invention is laminated thereon, the surface (100) of the Co or Co alloy is preferably grown in parallel to a substrate and an easy axis of magnetization is oriented in the substrate plane and thus a more excellent in-plane anisotropy film can be provided. The underlayer is not limited to Cr but may be any substance so long as it can orient the c axis of Co, parallel to the film plane.

A thickness of the underlayer is not particularly limited, but in general, it is preferably within a range from 0.02 to 1 micrometer. When it is 0.02 micrometer or less, the surface (110) of Cr is not sufficiently grown and thus it is difficult to orient the c-axis of the Co or Co alloy parallel to the film surface, whereas when it exceeds 1 micrometer, the effect applied to the in-plane orientation of the Co or Co alloy is saturated. Therefore, if the underlayer is made thicker than 1 micrometer, it will be more uneconomical.

A depth of the fine pores formed in an alumite layer can be adjusted by controlling a time of anodic oxidation. Although it is not necessary to describe, a depth of the fine pores is less than a thickness of the alumite layer.

Although the alumite layer can be directly formed on an aluminum substrate by anodic oxidation of the aluminum substrate, it can be also formed in such a manner that aluminum or aluminum alloy is deposited on a nonmagnetic substrate by a vapor deposition method and the vapor deposited layer is subjected to anodic oxidation. The vapor deposition method includes vacuum vapor deposition, ion plating, sputtering, ion beam deposition, chemical vapor deposition (CVD) and the like.

A nonmagnetic substrate used in the magnetic recording medium of the present invention includes a polymer film such as polyimide, polyethylene terephthalate and the like, glasses, ceramics, anodized aluminum, a metal plate such as brass and the like, a silicon single crystal plate, a silicon monocrystal plate the surface of which is subjected to a thermal oxidation treatment in addition to the aluminum substrate.

Further, the magnetic recording medium of the present invention includes various applications formed to enable them to be in sliding contact with a magnetic head, such as a magnetic tape and disk using as a substrate a synthetic resin film such as a polyester film, polyimide film and the like and a magnetic disk and drum using as a substrate a disk and drum composed of an aluminum plate, glass plate and the like.

As described above, given stable magnetic characteristics, a low anisotropy field in the film plane can be provided in the plane of a medium by using an in-plane magnetic anisotropy film which makes use of alumite.

According to the second aspect, the magnetic recording medium of the present invention is provided with an in-plane magnetic anisotropy film using porous alumite.

The porous alumite has many fine pores in a direction perpendicular to the film surface thereof (pore density: $~5\times10^{10}$ pores/$cm^2$) and the respective pores are completely separated by amorphous $Al_2O_3$. As a result, a material which is filled in the fine pores and exhibits in-plane magnetic anisotropy has a structure which is completely separated magnetically in the respective fine pores each other. Thus, the material exhibits perfect in-plane isotropic magnetic characteristics regardless filling condition and fabrication apparatus.

Therefore, a given stable reproducing output can be provided in either direction including circumferential or radial directions.

An apparent anisotropy filed in the film plane Hk in the magnetic recording medium of the present invention must be 100 Oe or less. The term "apparent" in this specification is used to represent a value determined by the following equation based on an anisotropic energy in the film plane obtained from the torque curve of a specimen being rotated in a magnetic field while a uniform magnetic field parallel to the film plane (~15 KOe) is imposed.

apparent anisotropy field $Hk=2\,Ku/Ms$ where, Ms represents a saturation magnetization of the specimen. When the apparent anisotropy field exceeds 100 Oe, a significant difference in magnetic characteristics is caused depending on the direction and location of the medium. As a result, a stable reproducing output cannot be provided. An ideal value of Hk is zero and thus a lower limit is not specified. In the state of Hk=0, perfect isotropic magnetic characteristics can be provided in the film plane.

The apparent anisotropy is controlled to 100 Oe or less in such a manner that magnetic particles are perfectly separated by a nonmagnetic region, so that magnetic coupling of the magnetic particles does not arise.

As apparent from the following examples, according to the present invention, an excellent in-plane magnetization film can be provided by making an in-plane remanence 2.5 times or more of a perpendicular remanence, a thickness of a magnetic layer from 500 to 5000 angstroms, a porosity of alumite of from 0.1 to 0.75, and an in-plane coercive force from 500 to 1500 Oe.

Next, the third aspect of the present invention will be described.

Conventionally, in the magnetic alumite film Fe has been used to form a perpendicularly magnetization film and thus it has been considered that Fe cannot be used for forming an in-plane magnetization film. It has been discovered by the inventors, however, that when Fe is used according to the following composition, i.e., $(Co_xNi_{1-x})_{1-y}Fe_y$ ($0.5 \leq x \leq 1$; $0 < y \leq 0.3$), even Co-Fe or Co-Ni-Fe alloy can be made into an excellent in-plane magnetic film of high saturation magnetization. Note that the in-plane magnetization film according to the present invention means a magnetic film having an in-plane remanence greater than a perpendicular remanence.

Therefore, according to the magnetic alumite film of the present invention, longitudinal magnetic recording can be effected, a reduction in reproduction output is restricted with respect to a spacing loss, and sufficient overwrite characteristics are expected.

Further, since respective magnetic particles in the alumite are surrounded by aluminum oxide and perfectly separated, the magnetic alumite film is excellent in corrosion resistance and durability and further, since the magnetic coupling of the particles is not effected, zigzag domains are generated with difficulty in a magnetizing transition region. As a result, medium noise is restrained to permit a high reproducing output to be provided. In addition, since anisotropy field in the film plane is very small, no output modulation arises in reproduction.

With respect to the reason why the excellent in-plane magnetic characteristics are realized, the inventors examined the mechanism which generates the in-plane magnetic anisotropy using various measuring and analyzing technologies. More specifically, the inventors investigated shape anisotropy, magnetocrystalline anisotropy, magnetostriction effect, surface anisotropy, and induced magnetic anisotropy. While the inventors were not able to clearly identify the factor by which the in-plane magnetic anisotropy of the alumite film of the above alloy is generated, it is hypothesized that perhaps the above five magnetic anisotropy generating factors integrally generate the in-plane magnetic anisotropy.

Figure 4:
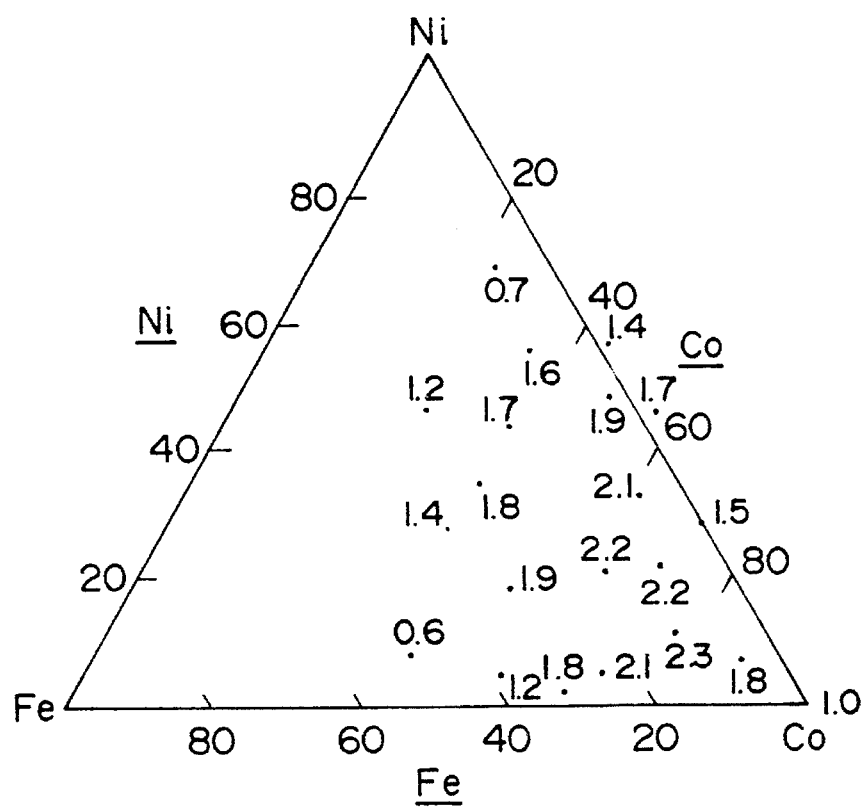
FIG. 4 shows the composition dependence of an in-plane residual magnetic flux density, when Co-Fe or Co-Ni-Fe alloy is filled in alumite fine pores. Note that the residual magnetic flux density is represented by a unit of kG.

FIG. 4 shows an example of the result of the measurement of the in-plane residual magnetic flux density (Br) of the Co-Fe or Co-Ni-Fe plated alumite film according to the present invention. Note that the data was measured under the condition of a porosity of 0.3. It is found from FIG. 4 that a high in-plane residual magnetic flux density can be provided in the range of $0.5 \leq x \leq 1$ and $0 < y \leq 0.3$ of the alloy composition $(Co_xNi_{1-x})_{1-y}Fe_y$. Further, with respect to R/W characteristics, it is found that a reproducing output is substantially proportional to the in-plane residual magnetic flux density (Br), and when compared at the maximum values, the above alloy composition could provide an output at least 40% higher than that of a substance composed of Co and Ni.

As described above, although the in-plane magnetization film can be formed by controlling the compositional ratio of Fe, other methods can be also used in addition to it.

For example, when Cr underlayers are filled in fine pores of alumite and the Co alloy according to the present invention is laminated thereon, the surface (100) of the Co alloy is grown in parallel to a substrate and an easy axis of magnetization is oriented in the film plane of the substrate and thus a more excellent in-plane magnetization film can be provided.

A method of forming the in-plane magnetization film from a view point of decreasing perpendicular shape anisotropy by lowering an axial ratio of fine pores of the alumite can also be used in addition to the above method using the magnetocrystalline anisotropy of Co. A diameter of fine pores of the alumite is substantially proportional to an electrolytic voltage (V) when anode oxidation is effected, and the higher the electrolytic voltage, the diameter of fine pores of the alumite is increased. Therefore, as the diameter of the fine pores is increased, the axial ratio of magnetic particles in the pores (depth of fine pores/diameter of fine pores) is lowered such that the depth of the fine pores is kept constant, which is advantageous to create the in-plane magnetization film. As an example, it is desirable that the magnetic particles have an axial ratio of 30 or less and preferably 10 or less.

Sulfuric acid can be used to the anodic oxidation bath. Since sulfuric acid has a large dissociation and lowers the electric resistance of a bath, a voltage applied thereto is about ~20 V, when an anodic oxidation is effected, and a diameter of fine pores is ~200 angstroms. In contrast to sulfuric acid, oxalic acid and phosphoric acid have a small dissociation constant and thus a large voltage is applied when an anodic oxidation is effected. Therefore, alumite having a fine pore diameter of ~500 angstroms can be obtained, and thus when a magnetic layer has the same thickness, alumite having an axial ratio half of that provided in the sulfuric acid bath can be obtained. When the fine pores are enlarged in a bath of phosphoric acid, sulfamic acid or the like after the anodic oxidation has been effected, the axial ratio can be further reduced.

As described above, the magnetic alumite film can be made as an in-plane film by the multiplied effect of the magnetocrystalline anisotropy due to the existence of the underlayer and the decrease of perpendicular shape anisotropy due to the axial ratio, as desired, in addition to the control of the compositional ratio of the Fe according to the present invention, so that the in-plane magnetization film having very excellent magnetic characteristics can be provided.

A thickness of the underlayer is not particularly limited, but in general, it is preferably within a range of from 0.02 to 1 micrometer. When it is 0.02 micrometer or less, the surface (110) of Cr is not sufficiently grown and thus it is difficult to longitudinally orient the easy axis of magnetization of Co-Ni alloy, whereas when it exceeds 1 micrometer, the effect applied to the longitudinal orientation of the Co alloy is saturated. Therefore, if the underlayer is made thicker than 1 micrometer, it will be more 1 uneconomical. The underlayer is not limited to Cr, but may be any substance so long as it can orient the c-axis of Co in plane direction of the film.

In general, the Co alloy magnetic layer of the magnetic recording medium according to the present invention preferably has a thickness in a range of from 0.05 to 5 micrometers.

A depth of the fine pores formed in the alumite layer can be adjusted by controlling the time of anodic oxidation. Although it is not necessary to describe, a depth of the fine pores is less than a thickness of the alumite layer.

According to the present invention, an in-plane magnetization film can be formed even if Fe is contained as a component constituting magnetic particles, and further a reproducing output can be increased by the existence of Fe.

PREFERRED EMBODIMENTS

EXAMPLES

The present invention will be described below in detail with reference to the examples.

Example 1

An aluminum substrate of a 2.5 inch size having a purity of 99.97% was cleaned and degreased in trichloroethane, the surface oxide layer thereof was removed in NaOH of 5 wt % at 50° C., and thereafter the substrate was neutralized in $HNO_3$ of 6 vol % at 20° C.

An anodic oxidation was effected in a bath containing $H_2SO_4$ of 1 mol/l and $Al_2(SO_4)_3$ of 5 g/l at 18° C. with a constant voltage (counter electrode: carbon) of 17.5 V to form an alumite layer of about 0.45 micron meter. At the time, a cell diameter (Dc) and a pore diameter (Dp) of the alumite were 450 angstroms and 150 angstroms, respectively. Thereafter, the alumite was dipped in $H_3PO_4$ of 1 wt % at 30° C. and then the anodic oxidation was effected until a voltage across both the electrodes reached 8 V (counter electrode: carbon) with a constant electric current density of 40 mA/dm². Next, the alumite was dipped in the bath for a predetermined period so that the pore diameter was enlarged up to 380 angstroms.

Next, the alumite was transferred to a plating bath to be subjected to a Co-P plating. The bath was composed of $Co^{2+}$ of 0.2 mol/l, $H_3BO_3$ of 0.2 mol/l, glycerine of 2 ml/l, and $NaPH_2O_2$ of 0 to 0.02 mol/l with a pH of 3 to 7 at 20° C., a power supply used for the plating was AC 500 Hz and 16 Vp-p (counter electrode: carbon), and Co-P magnetic particles of about 1500 angstroms in height were filled by plating.

A specimen made by using $NaPH_2O_2$ of 0.02 mol/l was cut off to 1 square centimeter, an external magnetic field of 16 KOe, which was parallel to a plane direction, was imposed thereon and the anisotropy in the film plane was determined by a torque curve with a result that the anisotropy field Hk in the film plane was 15 Oe.

Comparative Example 1

An aluminum substrate having a thickness of 1.28 mm with a Ni-P layer was used as a nonmagnetic substrate and a 500 angstrom thick $Co_{80}Ni_{20}$ magnetic layer was formed on a Cr underlayer (thickness: 5000 angstroms) by a sputtering method. Then, an anisotropy in the film plane was determined by the same method with a result that it was 830 Oe as Hk.

FIG. 1 shows how the in-plane magnetic characteristics (coercive force and squareness) of the above specimen obtained from Example 1 and the Co-Ni sputtered film of the Comparative Example 1 were varied when the specimens were rotated in an external magnetic field under the condition that the external magnetic field was applied in-plane direction of the film during rotation. In FIG. 1, an in-plane coercive force and an in-plane squareness are normalized by the maximum values of the respective specimens. The Co-P plated alumite film provides a constant in-plane coercive force and a constant in-plane squareness in any rotation angle, but in the case of the CoNi sputtered film, an in-plane coercive force is reduced by 19.7% and an in-plane squareness is reduced by 9.8% in comparison with the maximum 1 values depending on angle.

It is understood from the fact that the in-plane magnetization film using alumite (in-plane coercive force: 700 Oe, in-plane squareness: 0.64) exhibits good in-plane magnetic properties and their properties are almost independent of the measuring direction in-plane. So, the magnetic recording disk using this material exhibits little output modulation.

Example 2

The disk obtained from Example 1 was polished so that a Co-P magnetic layer was made to a thickness of 1 micron meter angstroms. Next, a perfluoropolyether lubricant was coated on the surface of the disk and R/W characteristics were evaluated. A magnetic head used was a Mn-Zn ferrite head with a track width of 16 micron meters, a gap length of 1.2 micron meters, and the number of windings of 16+16, and a spacing was 0.3 micron meter (linear speed: 8.13 m/s).

Table 1 shows various characteristics of the magnetic alumite films made in Example 1 and a Co-Ni plated magnetic alumite film prepared by Kawai et al.

TABLE 1

| Specimen | Cell Dia. (Å) | Pore Dia. (Å) | Magnetic Layer Thickness (μm) | Porosity |
|---|---|---|---|---|
| (a) | 450 | 270 | 0.15 | 0.33 |
| (b) | 450 | 270 | 0.15 | 0.33 |
| (c) | 450 | 380 | 0.15 | 0.64 |
| (d) | 450 | 380 | 0.15 | 0.64 |
| (e) | 450 | 380 | 0.15 | 0.64 |
| (f) | 450 | 380 | 0.15 | 0.64 |
| (g) | 450 | 380 | 0.15 | 0.64 |
| Kawai et al | 400 | 100 | 1.00 | 0.06 |

| Specimen | pH of Plating Bath | P Content (at %) | $Mr_\parallel / Mr_\perp$ | $Hc_\parallel$ (Oe) | Ms (emu/cc) |
|---|---|---|---|---|---|
| (a) | 4 | 0 | 0.31 | 340 | 469 |
| (b) | 4 | 9.0 | 2.70 | 1040 | 426 |
| (c) | 4 | 0 | 10.90 | 350 | 909 |
| (d) | 3 | 10.8 | 3.60 | 1330 | 811 |
| (e) | 4 | 7.0 | 10.70 | 980 | 848 |
| (f) | 5 | 5.4 | 9.51 | 710 | 860 |
| (g) | 6 | 2.7 | 12.0 | 520 | 884 |
| Kawai et al | 6.5 | 0 | 2.4 | 1150 | 57 |

In Table 1, the specimen (a) to which Co simple substance was plated has a saturation magnetization (Ms) greater than 57 emu/cc made by Kawai et al, but it has a $Mr_\parallel / Mr_\perp$ of 0.31 and a small $Hc_\parallel$ of 340 Oe.

Specimen (c) has a pore diameter which was enlarged from 270 angstroms of Specimen (a) to 380 angstroms to achieve an improved in-plane magnetic anisotropy and saturation magnetization of $Mr_\parallel / Mr_\perp = 10.90$ and Ms=909 emu/cc, but has a small $Hc_\parallel$ of 350 Oe.

On the other hand, Specimen (b) is the same as Specimen (a) with respect to configuration, but has P of 9.0 at % added to Co and thus the overall characteristics thereof are improved with $Mr\|/Mr\perp=2.70$, $Hc\|=1040$ Oe, and $Ms=426$ emu/cc.

In the case of Specimens (d) to (g), P is added to Co and a content thereof is changed in a range from 2.7 to 10.8 at % by changing a pH in the plating bath in addition to the improvement in configuration similar to that of Specimen (c). Specimens (d) to (g) exhibit excellent in-plane magnetic characteristics in that $Mr\|/Mr\perp$ is 2.7 to 10.8, $Hc\|$ is 520 to 1330 Oe and Ms is 811 to 884 emu/cc.

Table 2 shows the result of reproducing outputs at 4 KFCI of Specimens (b) and (d) to (g) shown in Table 1 and the Co-Ni plated alumite film of Kawai et al.

TABLE 2

| Specimen | Reproducing Output at 4KFCI ($\mu$Vp-p/$\mu$m.m/s.Turn) |
|---|---|
| (b) | 0.049 |
| (d) | 0.091 |
| (e) | 0.098 |
| (f) | 0.096 |
| (g) | 0.103 |
| Kawai et al | 0.020 |

As apparent from the result shown in Table 2, the reproducing outputs of the Specimens (b) and (d) to (g) are 2.5 to 5.0 times the CoNi plated alumite film of Kawai et al. This is attributed to the result of the multiplied effects of the increase in $Mr\|/Mr\perp$, the reduction in thickness of the magnetic layer, and the increase in porosity of the alumite.

Example 3

An anodic oxidation was effected by the same method as that of Example 1 using an aluminum substrate similar to that of Example 1 and an alumite having an alumite layer of 0.45 micron meter thick, a cell diameter of 450 angstroms, and a pore diameter of 380 angstroms was made. Next, the alumite was transferred to a plating bath to be subjected to a Fe plating. The bath was composed of $Fe^{2+}$ of 0.2 mol/l, $H_3BO_3$ of 0.2 mol/l, glycerine of 2 ml/l with a pH of 3.0 (at 20° C.), and Fe particles of about 1500 angstroms in height were filled by plating using AC 500 Hz and 16 Vp-p (counter electrode: carbon).

Example 4

An anodic oxidation was effected by the same method as that of Example 1 using an aluminum substrate similar to that of Example 1 and an alumite having an alumite layer of 0.45 micron meter thick, a cell diameter of 450 angstroms, and a pore diameter of 380 angstroms was made. Next, the alumite was transferred to a plating bath to be subjected to a Fe-Cu plating. The bath was composed of $Fe^{2+}$ of 0.2 mol/l, $Cu^{2+}$ of 0.002 mol/l, $H_3BO_3$ of 0.2 mol/l, glycerine of 2 ml/l with a pH of 3.0 (at 20° C.), and a multi-layered Fe/Cu particles of about 1500 angstroms in height were filled in alumite pores by plating using a pulse waveform power supply. Fe and Cu had an average thickness of 300 angstroms and 20 angstroms, respectively.

Comparative Example 2

An anodic oxidation was effected by a method similar to that of Example 1 using the same aluminum substrate as that of Example 1 except that the pore diameter enlarging treatment was not effected, and an alumite having an alumite layer of 0.45 micron meter thick, a cell diameter of 450 angstroms, and a pore diameter of 150 angstroms was obtained. Next, the alumite was transferred to a plating bath similar to that of Example 1 to fill the pores of the alumite with Fe of 1500 angstroms in height.

Example 5

The R/W characteristics of the disks made in Examples 3 and 4 and Comparative Example 2 were evaluated by the same method as that of Examples 1 and 2.

Table 3 shows the various characteristics of the magnetic alumite films made by Examples 3 and 4 and Comparative Example 2.

TABLE 3

| Specimen | Cell Dia. (Å) | Pore Dia. (Å) | Magnetic Layer Thickness ($\mu$m) | Porosity |
|---|---|---|---|---|
| Example 3 | 450 | 380 | 0.15 | 0.64 |
| Example 4 | 450 | 380 | 0.15 | 0.64 |
| Comparative Example 2 | 450 | 150 | 0.15 | 0.10 |

| Specimen | pH of Plating Bath | Cu Content (at %) | $Mr\|/Mr\perp$ | $Hc\|$ (Oe) | Ms (emu/cc) |
|---|---|---|---|---|---|
| Example 3 | 3 | 0 | 5.0 | 175 | 1100 |
| Example 4 | 3 | 7.0 | 13.5 | 600 | 1000 |
| Comparative Example 2 | 3 | 0 | 0.2 | 250 | 170 |

As apparent from the result shown in Table 3, since the perpendicular shape anisotropy of Examples 3 and 4 was decreased by pore widening and by layer multiplication, the value of the $Mr\|/Mr\perp$ of the Examples 3 and 4 was made to 10 times or more and the coercive force thereof was also improved as compared with Comparative Example 2. In addition, the values of Ms of Examples 3 and 4 was increased to six times that of Comparative Example 2 by the increase in the porosity.

Table 4 shows the reproducing outputs of Examples 3 and 4 and Comparative Example 2 at 4 KFCI.

TABLE 4

| Specimen | Reproducing Output at 4KFCI ($\mu V_{p-p}$/$\mu$m.m/s.Turn) |
|---|---|
| Example 3 | 0.070 |
| Example 4 | 0.075 |
| Comparative Example 2 | 0.010 |

It is notified that the decrease of perpendicular shape anisotropy, and the improvement of the Ms by the increase in the porosity contribute to increase the reproducing output.

Example 6

An aluminum substrate having a purity of 99.99% (thickness: 65 micron meters, 20 mm×20 mm) was subjected to an ultrasonic cleaning in torichloroethylene, the surface oxide layer thereof was removed in NaOH of 5 wt %, and thereafter the substrate was neutralized in $HNO_3$ of 6 vol % and washed with water. Next, anodic oxidation of the aluminum substrate was carried out in a bath (20° C.) of $H_2SO_4$ of 1 mol/l using carbon as a counter electrode with a current density of 1 A/dm$^2$ to form an alumite layer of 0.3 micron meter thick. Thereafter, the diameter of the fine pores of the 1 alumite was enlarged to 270 angstroms in a bath of $H_3PO_4$ of 1 wt % (30° C.). A Co-P plating bath was composed of $CoSO_4.7H_2O$ of 0.2 mol/l, $H_3BO_3$ of 0.2 mol/l, glycerine of 2 ml/l, and $NaPH_2O_2.H_2O$ of 0.1 mol/l and a pH of the bath was adjusted to 4.0 by $H_2SO_4$ of 1 mol/l. A power supply of AC 500 Hz and 6 $V_{p-p}$ was used for the plating. The carbon was used as the counter electrode and the plating was effected for 3 minutes at 20° C.

Comparative Example 3

A Co plated film was formed by the same method as that of Example 6 except that $NaPH_2O_2.H_2O$ was not added to a plating bath.

Example 7

After an alumite layer having a thickness of 0.45 micron meter was formed on a substrate by the same method as that of Example 6, the diameter of the fine pores of the alumite was enlarged to 370 angstroms in a bath containing phosphoric acid of 1 wt % at 30° C. Thereafter, the substrate was subjected to a CoNi-P plating by the following method. A plating bath was composed of $CoSO_4.7H_2O$ of 0.090 mol/l, $NiSO_4.6H_2O$ of 0.038 mol/l, $H_3BO_3$ of 0.24 mol/l, glycerine of 2 ml/l, and $NaPH_2O_2.H_2O$ of 0.51 mol/l and a pH was adjusted to 6.5 by NaOH of 5 wt %. An AC power supply of AC 500 Hz, 25 $V_{p-p}$ was used for the plating, a DC bias was imposed so that −15 V was applied to an alumite side and +10 V was applied to a counter electrode (carbon) side, and the plating was effected for 10 seconds at 20° C.

Comparative Example 4

A CoNi plated film was formed by the same method as that of Example 7 except that a plating bath was composed of $CoSO_4.7H_2O$ of 0.064 mol/l, $NiSO_4.6H_2O$ of 0.064 mol/l, $H_3BO_3$ of 0.24 mol/l, and glycerine of 2 ml/l.

Example 8

After an alumite layer having a thickness of 0.3 micron meter was formed on a substrate by the same method as that of Example 6, the diameter of the fine pores of the alumite was enlarged to 370 angstroms in a bath containing phosphoric acid of 1 wt % at 30° C. Thereafter, a CoFe-P plating was effected by the following method. A plating bath was composed of $CoSO_4.7H_2O$ of 0.090 mol/l, $FeSO_4(NH_4)_2SO_4.6H_2O$ of 0.006 mol/l, $H_3BO_3$ of 0.24 mol/l, glycerine of 2 ml/l, $NaPH_2O_2.H_2O$ of 0.51 mol/l and a pH was adjusted to 4.0 using $H_2SO_4$ of 1 mol/l. An AC power supply of AC 500 Hz and 25 $V_{p-p}$ was used for the plating, a DC bias was imposed so that −15 V was applied to an alumite side and +10 V was applied to a counter electrode (carbon) side, and the plating was effected for 10 seconds at 20° C.

Comparative Example 5

A CoFe plated film was formed by the same method as that of Example 8 except that $NaPH_2O_2, H_2O$ was not added to a plating bath.

Example 9

After an alumite layer having a thickness of 0.3 micron meter was formed on a substrate by the same method as that of Example 6, the diameter of the fine pores of the alumite was enlarged to 370 angstroms in a bath containing phosphoric acid of 1 wt % at 30° C. Thereafter, a CoNiFe-P plating was effected by the following method. A plating bath was composed of $CoSO_4.7H_2O$ of 0.085 mol/l, $NiSO_4.6H_2O$ of 0.036 mol/l, $FeSO_4(NH_4)_2SO_4.6H_2O$ of 0.007 mol/l, $H_3BO_3$ of 0.24 mol/l, glycerine of 2 ml/l, and $NaPH_2O_2.H_2O$ of 0.51 mol/l, and a pH was adjusted to 4.0 using $H_2SO_4$ of 1 mol/l. An AC power supply of AC 500 Hz and 25 $V_{p-p}$ was used for the plating, a DC bias was imposed so that −15 V was applied to an alumite side and +10 V was applied to a counter electrode (carbon) side, and the plating was effected for 10 seconds at 20° C.

Comparative Example 6

A CoNiFe plated film was formed by the same method as that of Example 9 except that $NaPH_2O_2.H_2O$ was not added to a plating bath.

An in-plane coercive force and squareness of the magnetic alumite films obtained from the above Examples and Comparative Examples were measured by a vibrating sample magnetometer with the maximum applied magnetic field of 10 KOe.

Table 5 summarizes the result of the measurement.

TABLE 5

| Specimen | Film Composition (at %) | In-plane Coercive Force (Oe) | In-plane Squareness |
|---|---|---|---|
| Example 6 | $Co_{88.3}P_{11.7}$ | 1240 | 0.43 |
| Comparative Example 3 | $Co_{100}$ | 440 | 0.14 |
| Example 7 | $Co_{77.8}Ni_{9.7}P_{12.5}$ | 1000 | 0.45 |
| Comparative Example 4 | $Co_{89.0}Ni_{11.0}$ | 550 | 0.27 |
| Example 8 | $Co_{84.3}Fe_{4.4}P_{11.3}$ | 920 | 0.39 |
| Comparative Example 5 | $Co_{95.0}Fe_{5.0}$ | 670 | 0.25 |
| Example 9 | $Co_{76.3}Ni_{8.5}Fe_{4.4}P_{10.7}$ | 1050 | 0.43 |
| Comparative Example 6 | $Co_{85.7}Ni_{9.5}Fe_{4.8}$ | 700 | 0.31 |

As apparent from the result shown in Table 5, both the in-plane coercive force and squareness of the magnetic films were greatly improved by adding P into the ferromagnetic particles in the alumite pores.

Example 10

A CoNi-P plating was effected by the same method as that of Example 7 except that, in the composition of the plating bath of Example 7, $(CoSO_4.7H_2O)+(NiSO_4.6H_2O)=0.128$ mol/l was kept unchanged and a ratio of $Co^{2+}/(Co^{2+}+Ni^{2+})$ was changed.

Comparative Example 7

A CoNi plating was effected by the same method as that of Comparative Example 4 except that, in the composition of the plating bath of Comparative Example 4, $(CoSO_4.7H_2O)+(NiSO_4.6H_2O)=0.128$ mol/l was kept unchanged and a ratio of $Co^{2+}/(Co^{2+}+Ni^{2+})$ was changed.

Figure 2B:
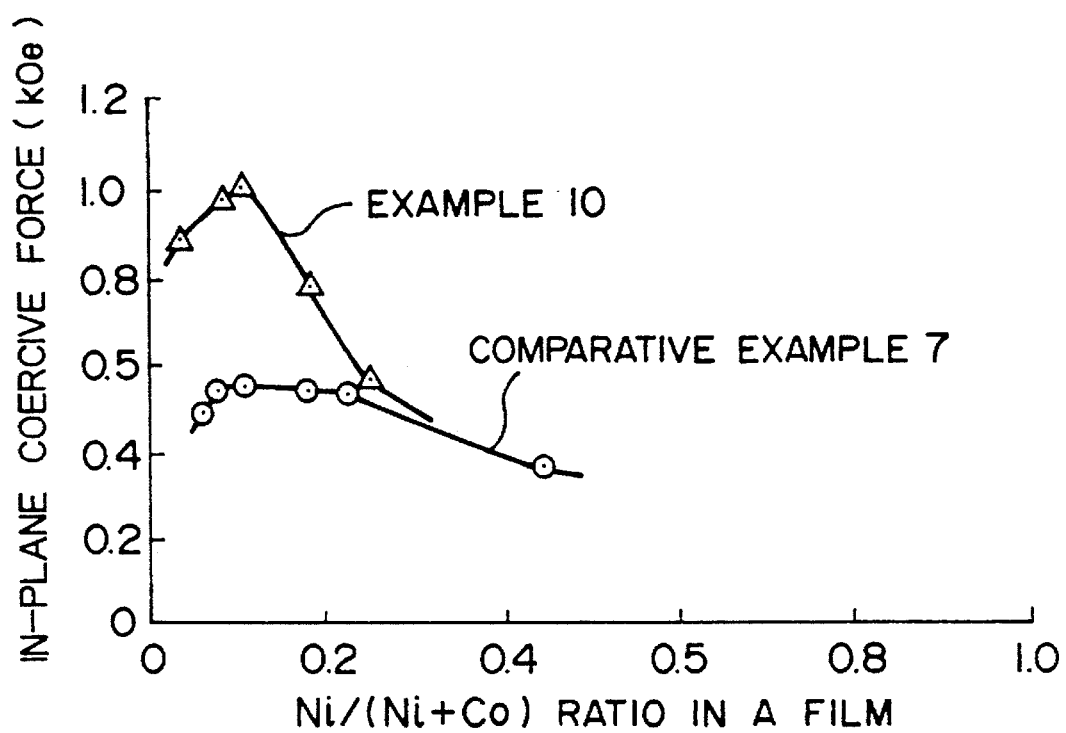
FIG. 2B is a characteristic diagram showing the relationship between the content of Ni/(Ni+Co) in the films and the in-plane coercive force of the plated films obtained from Example 10 and Comparative Example 7.
Figure 3:
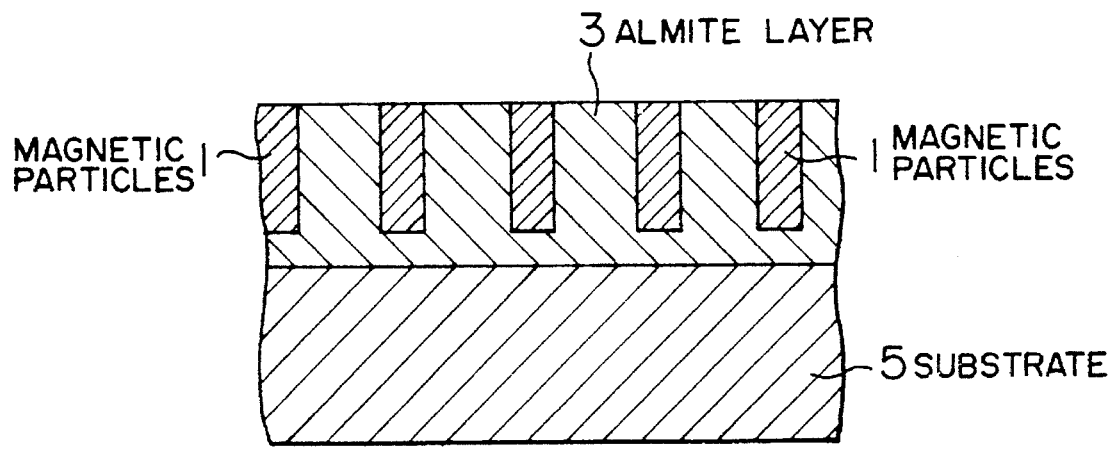
FIG. 3 is a cross sectional view of an example of a magnetic recording medium having alumite fine pores in which a magnetic member is filled by plating.

FIGS. 2A and 2B show the relationship between the in-plane squareness and coercive force of the magnetic alumite films obtained from Example 10 and Comparative Example 7, and the ratio of atoms of Ni/(Ni+Co) in the films. Note that in Example 10, a content of P, i.e., P/(Co+Ni+P) is 0.092 to 0.135, and Comparative Example 7 does not contain P. As apparent from FIG. 2, it is found that the P content causes the in-plane squareness and coercive force to be increased in the region where a large amount of Co is contained. It is considered that the saturation magnetization of the film is large at higher Co content, and the addition of P contributes to the improvement of reproducing output.

Example 11

A Co-P plating was effected by the same method as that of Example 6 except that the pH of a plating bath was adjusted to 6.5 by NaOH of 5 wt %.

Table 6 shows the result of the measurement of the in-plane coercive force and squareness of Co-P plated films obtained from Examples 6 and 11.

TABLE 6

| Specimen | Film Composition (at %) | pH | In-plane Coercive Force (Oe) | In-plane Square-ness |
|---|---|---|---|---|
| Example 6 | $Co_{88.3}P_{11.7}$ | 4.0 | 1240 | 0.43 |
| Example 11 | $Co_{93.8}P_{6.2}$ | 6.5 | 900 | 0.28 |

As apparent from the result shown in Table 6, the increase of pH from 4.0 to 6.5 causes the P content to be reduced and the in-plane magnetic characteristics to be a little deteriorated, even if the composition of the plating bath is unchanged.

Example 12

An anodic oxidation of a rolled aluminum substrate of a purity of 99.99% was carried out in $H_2SO_4$ of 1 mol/l at 20° C. with a constant electric current density of 1 A/dm$^2$ to form an alumite layer of 0.45 micron meter thick. At the time, a cell diameter and a pore diameter were 450 angstroms and 130 angstroms, respectively. Next, the specimens were dipped in a $H_3PO_4$ of 1 wt % at 30° C. the pore diameter was enlarged to 395 angstroms and homogenization of barrier layer was carried out. Thereafter, $NaPH_2O_2$ of 0 to 0.2 mol/l was added to a basic plating bath containing $CoSO_4$ of 0.2 mol/l, $H_3BO_3$ of 0.2 mol/l, and glycerine of 2 ml/l, and a Co-P plating was effected at 20° C. with a pH of 4 using an AC power supply of AC 500 Hz and 16 $V_{p-p}$. Table 7 shows various characteristics of the thus obtained typical Co-P plated alumite films.

TABLE 7

|  | Specimen A | Specimen B |
|---|---|---|
| P Content (at %) | 0 | 9.0 |
| Cell Dia. (Å) | 450 | 450 |
| Pore Dia. (Å) | 270 | 270 |
| Magnetic Layer Thickness (Å) | 1450 | 2500 |
| Axial Ratio | 5.4 | 9.3 |
| Porosity | 0.33 | 0.33 |
| S// | 0.098 | 0.414 |
| S⊥ | 0.313 | 0.235 |
| Hc//(Oe) | 340 | 1040 |
| Hc⊥ (Oe) | 1680 | 1350 |
| S///S⊥ | 0.31 | 1.76 |
| Ms (emu/cc) | 470 | 430 |

|  | Specimen C | Specimen D |
|---|---|---|
| P Content (at %) | 0 | 5.0 |
| Cell Dia. (Å) | 450 | 450 |
| Pore Dia. (Å) | 370 | 370 |
| Magnetic Layer Thickness (Å) | 750 | 1400 |
| Axial Ratio | 2.0 | 3.8 |
| Porosity | 0.61 | 0.61 |
| S// | 0.667 | 0.580 |
| S·S | 0.061 | 0.054 |
| Hc// (Oe) | 340 | 680 |
| Hc⊥ (Oe) | 460 | 730 |

TABLE 7-continued

| S///S⊥ | 10.9 | 10.7 |
|---|---|---|
| Ms (emu/cc) | 870 | 830 |

In Table 7, Specimens A and B exhibit the effect of the addition of P under the condition that a pore diameter is 270 angstroms and a porosity is 0.33. Specimen A which does not contain P has a S///S⊥ of 0.31, that is, this film is a perpendicular magnetization film. Whereas, Specimen B which contains P of 9.0 at % has a S improved from 0.098 to 0.414 and a S///S⊥ of 1.76 and is moved to an in-plane magnetization film (S///S⊥>1) regardless that it has an axial ratio of about twice that of Specimen A. However, Specimen B has a large Hc of 1350 Oe, and thus it is considered that there still remains a perpendicular component.

Specimen C and D are used to examine the effect of the addition of P, when a porosity is increased from 0.33 to 0.61 and an axial ratio is reduced to 5 or less. Specimen C which does not contain P has a significantly increased S⊥ of 0.667 but has a low in-plane coercive force of 340 Oe, whereas Specimen D which contains P of 5.0 at % exhibits an excellent in-plane magnetic characteristics with a S// of 0.58, S///S⊥ of 10.7, and an Hc// of 680 and has a perpendicular coercive force reduced to about 700 Oe.

Example 13

A rolled aluminum substrate having a purity of 99.99% (3 cm×3 cm×65 micron meters thick) was cleaned and degreased in trichloroethane and a anode oxidation was carried out in a bath containing $H_2SO_4$ of 1 mol/l and $Al_2(SO_4)_3$ of 5 g/l at 18° C. with a constant voltage of 17.5 V to form an alumite layer of 0.45 micron meter thick. Next, the alumite was transferred to $H_3PO_4$ of 1 wt % and the anodic oxidation was again carried out until a voltage across both electrodes (counter electrode: carbon) reached 8 V with a constant electric current density of 40 mA/dm$^2$, and then the specimen was dipped in the bath to enlarge the diameter of the fine pores thereof.

Thereafter, the specimen was treated in the bath for 2 minutes with the constant voltage of 8 V so that a barrier layer was homogenized.

Next, the specimen was transferred to a plating bath containing $Co^{2+}$ of 0.2 mol/l, $Cu^{2+}$ of 0.002 mol/l, $H_3BO_3$ of 0.2 mol/l, and glycerine of 2 ml/l, and multi-layered Co/Cu particles of 0.25 micron meter in height were filled into the fine pores of the specimen by plating using a pulse wave power supply.

The basic idea of the pulse plating is an alternative application of an electric potential (ECo) by which $Co^{2+}$ is reduced and an electric potential (ECu) by which $Cu^{2+}$ is reduced.

Example 14

$NaPH_2O_2$ having a concentration of 0.02 mol/l was added to the plating bath used in the Example 13 and a multi-layered $Co_{94}$-$P_6$/Cu particles of 0.25 micron meter in height were filled into the fine pores of the alumite of Example 13 by plating.

Example 15

$Fe^{2+}$ having a concentration of 0.2 mol/l was added to the plating bath used in the Example 13 and a multilayered $Fe_{60}$-$Co_{40}$/Cu particles of 0.25 micron meter in height were filled into the fine pores of the alumite of Example 13 by plating.

Example 16

Cu$^{2+}$ was removed from the plating bath used in Example 13 and Ni$^{2+}$ having a concentration of 0.1 mol/l was added thereto and a multi-layered Co/Ni particles of 0.25 micron meter in height were filled into the fine pores of the alumite of Example 13 by plating.

Example 17

Cu$^{2+}$ was removed from the plating bath used in Example 13 and Fe$^{2+}$ having a concentration of 0.2 mol/l was added thereto and a Fe/Cu multi-film of 0.25 micron meter was filled into the fine pores of the alumite of Example 13 by plating.

Comparative Example 8

The Co simple substance particles were filled into the fine pores of an alumite under the same condition as that of Example 13 except that a plating bath did not contain Cu$^{2+}$ and a power supply of AC 500 Hz and 16 $V_{p-p}$ was used.

Comparative Example 9

The Fe simple substance particles were filled into the fine pores of an alumite under the same condition as that of Example 13 except that a plating bath did not contain Cu$^{2+}$ and a power supply of AC 500 Hz and 16 $V_{p-p}$ was used.

Table 8 shows the configurational characteristics and magnetic characteristics of the magnetic alumite films obtained in Examples 13 to 17 and Comparative Example 8 and 9.

TABLE 8

| | Cell Dia. (A) | Pore Dia. (A) | Porosity | Mr///Ms |
|---|---|---|---|---|
| Example 13 | 450 | 380 | 0.64 | 0.68 |
| Example 14 | 450 | 380 | 0.64 | 0.74 |
| Example 15 | 450 | 380 | 0.64 | 0.65 |
| Example 16 | 450 | 380 | 0.64 | 0.70 |
| Example 17 | 450 | 380 | 0.64 | 0.60 |
| Comparative Example 8 | 450 | 380 | 0.64 | 0.64 |
| Comparative Example 9 | 450 | 380 | 0.64 | 0.32 |

| | Hc// (Oe) | Cu Layer Thickness (Å) | Ni Layer Thickness (Å) |
|---|---|---|---|
| Example 13 | 520 | 200 | — |
| Example 14 | 790 | 200 | — |
| Example 15 | 600 | 200 | — |
| Example 16 | 800 | — | 200 |
| Example 17 | 500 | 200 | — |
| Comparative Example 8 | 340 | — | — |
| Comparative Example 9 | 175 | — | — |

As apparent from the result shown in Table 8, the provision of the layer structure in the magnetic particles improves the in-plane squareness and coercive force as compared with the cases in which plating was effected only by Co or Fe. From this result, it is considered that the introduction of the multi-layered structure results in the effect of lowering the shape anisotropy of the particles.

The layered structure is not necessarily required to be a perfect layer.

Example 18

An aluminum substrate having a purity of 99.99% was cleaned by trichloroethylene, and after the surface oxide layer thereof was removed in NaOH of 5 wt %, the substrate was neutralized in HNO$_3$ of 6 vol % and washed with water. Next, an anodic oxidation of aluminum substrate was carried out in a bath (20° C.) containing H$_2$SO$_4$ of 1 mol/l using carbon as a counter electrode with a current density of 1 A/dm$^2$ to form an alumite layer of 3 micron meter. Thereafter, the diameter of the fine pores of the alumite was enlarged to 260 angstroms in a bath containing H$_3$PO$_4$ of 1 wt % (30° C.). A plating bath was composed of H$_3$BO$_3$ of 0.2 mol/l, glycerine of 2 ml/l, and further a mixture prepared by CoSO$_4$.7H$_2$O, FeSO$_3$(NH$_4$)$_2$SO$_4$.6H$_2$O, and NiSO$_4$.6H$_2$O to provide a desired alloy compositional ratio. A pH of the bath was adjusted to 3 by H$_2$SO$_4$ of 1 mol/l. A power supply of AC 500 Hz and 16 $V_{p-p}$ was used for plating and the plating was continued using carbon as a counter electrode at 20° C. until overflow occurred. Several kinds of the thus formed magnetic alumite films were polished to reduce a thickness of the magnetic layer thereof to 0.7 micron meter, and the recording characteristics thereof were evaluated under the following conditions. A used magnetic head was a metal-in-gap (MIG) type ring head having a CoNbZr amorphous layer (Bs9000G) sputtered to the vicinity of the gap thereof and had a gap length of 0.44 micron meter. A spacing between the magnetic head and a recording medium in the evaluation was 0.22+0.1 micron meter, and the performance of various mediums were compared based on an output at a recording density of 10 KFCI. Table 9 summarizes the composition of the prepared specimens and the result of the measurement of the in-plane residual magnetic flux density Br (kG) and the reproducing output thereof at a recording density of 10 KFCI. Note that, in Table 9, the reproducing output of Specimen composed of Co$_{70}$Ni$_{30}$ is used as a reference to the reproducing outputs.

TABLE 9

| Specimen | Composition | In-plane Residual Magnetic Flux Density (kG) | Reproducing Output at 10 KFCI (dB) |
|---|---|---|---|
| A | Co$_{70}$Ni$_{30}$ | 1.5 | 0.0 |
| B | Co$_{70}$Ni$_{20}$Fe$_{10}$ | 2.2 | +3.3 |
| C | Co$_{50}$Ni$_{48}$Fe$_2$ | 1.9 | +2.0 |
| D | Co$_{70}$Fe$_{30}$ | 1.8 | +1.5 |
| E | Co$_{25}$Ni$_{46}$Fe$_{29}$ | 1.1 | −2.7 |
| F | Co$_{100}$ | 1.0 | −3.5 |

As apparent from the result shown in Table 9, the medium according to the present invention satisfying the condition of $0.5 \leq x \leq 1$ and $0 < y \leq 0.3$ in the composition of (Co$_x$Ni$_{1-x}$)$_{1-y}$Fe$_y$ forms an in-plane magnetization film of high saturation magnetization and thus can improve the reproducing output thereof.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Claimed is:

1. A magnetic recording medium comprising an aluminum or aluminum alloy substrate and a magnetic alumite layer formed on said substrate, said magnetic alumite layer, formed by anodic oxidation of said aluminum or aluminum alloy, comprising fine pores filled with a ferromagnetic material to provide said magnetic layer in a discrete form, said magnetic alumite layer having an in-plane remanence at least 3.6 times greater than a perpendicular remanence, said ferromagnetic material being selected from at least one member of the group consisting of Co containing P, and a Co alloy containing P, content of said P in said ferromagnetic material being within a range of from 0.05 at % to 33 at %, said magnetic alumite layer having a thickness of from 500 to 5000 angstroms, said alumite layer having a porosity of from 0.1 to 0.75 and said recording medium having an in-plane coercive force of from 500 to 1500 Oe.

2. A magnetic recording medium according to claim 1, wherein said ferromagnetic material filled in said fine pores by plating comprises Co-P having an axial ratio within a range of from 0.5 to 10.

3. A magnetic recording medium according to claim 1, wherein said magnetic alumite layer is an in-plane magnetic anisotropy film formed on said substrate, wherein the anisotropy magnetic field in said film plane is 100 Oe or less.

4. A magnetic recording medium comprising an aluminum or aluminum alloy substrate and a magnetic alumite layer formed on said substrate, said magnetic alumite layer, formed by anodic oxidation of said aluminum or aluminum alloy, comprising fine pores filled with a ferromagnetic material and a non-magnetic material or a magnetic material having a low saturation magnetization less than that of said ferromagnetic materials said ferromagnetic material being selected from at least one member of the group consisting of a Co containing P, and a Co alloy containing P, said magnetic layer having a thickness of from 500 to 5000 angstroms, said alumite layer having a porosity of from 0.1 to 0.75 and said recording medium having an in-plane coercive force from 500 to 1500 Oe, wherein said ferromagnetic material is filled in said fine pores in a long axis direction thereof alternately with said non-magnetic material or said magnetic material having a low saturation magnetization less than that of said ferromagnetic material to form a discrete layered structure, having an in-plane remanence $Mr\|$ at least 3.6 times greater than a perpendicular remanence $Mr\perp$.

5. A magnetic recording medium according to claim 4, wherein the content of said P in said ferromagnetic material is within a range of from 0.05 at % to 33 at %.

6. A magnetic recording medium according to claim 1, wherein said ferromagnetic material is a cobalt alloy containing P selected from the group consisting of Co-Ni, Co-Fe, and Co-Ni-Fe.

7. A magnetic recording medium according to claim 3, wherein said magnetic recording medium is a rigid disk.

8. A magnetic recording medium according to claim 5, wherein the content of said P is within a range of from 2 to 10 at %.

* * * * *